US007385486B2

(12) United States Patent
Danz et al.

(10) Patent No.: US 7,385,486 B2
(45) Date of Patent: Jun. 10, 2008

(54) DEVICE FOR DETECTING MOVING OBJECTS

(75) Inventors: Christian Danz, Stuttgart (DE); Jie Ge, Stuttgart-Hausen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/579,277

(22) PCT Filed: Jul. 22, 2004

(86) PCT No.: PCT/DE2004/001631

§ 371 (c)(1),
(2), (4) Date: Apr. 27, 2007

(87) PCT Pub. No.: WO2005/051709

PCT Pub. Date: Jun. 9, 2005

(65) Prior Publication Data
US 2007/0279199 A1 Dec. 6, 2007

(30) Foreign Application Priority Data
Nov. 12, 2003  (DE) ............................... 103 52 800

(51) Int. Cl.
*B60Q 1/00* (2006.01)
(52) U.S. Cl. .................... 340/435; 340/436; 340/903
(58) Field of Classification Search ............... 340/435, 340/436, 901, 903, 437
See application file for complete search history.

(56) References Cited

U.S. PATENT DOCUMENTS

| 5,450,057 | A |   | 9/1995  | Watanabe       |
|-----------|---|---|---------|----------------|
| 5,572,484 | A |   | 11/1996 | Franke et al.  |
| 5,754,123 | A |   | 5/1998  | Nashif et al.  |
| 5,777,563 | A |   | 7/1998  | Hull et al.    |
| 5,905,457 | A | * | 5/1999  | Rashid ................. 342/70 |

FOREIGN PATENT DOCUMENTS

| DE | 42 28 794  | 3/1994  |
| DE | 195 26 452 | 10/1996 |
| DE | 101 60 299 | 6/2003  |

OTHER PUBLICATIONS

*Automotive Electrical Systems* (chapter entitled "Parking Systems")., Automotive Electronics, Vieweg Verlag, 1998, pp. 283-285.

* cited by examiner

*Primary Examiner*—Daryl C. Pope
(74) *Attorney, Agent, or Firm*—Kenyon & Kenyon LLP

(57) ABSTRACT

A device for detecting moving objects present in the blind spot of a vehicle, the device having at least one object detection sensor, which, when the vehicle is backed out of a parking space, detects the distance between objects moving at an angle to the vehicle and sends it to an evaluation unit, and the evaluation unit determines the relative velocity from the distance sent to it, and a warning device is switched on as a function of the distance, the relative velocity and the velocity of the driver's vehicle to notify the driver of the object moving at an angle to the driver's vehicle.

26 Claims, 3 Drawing Sheets

DEVICE FOR DETECTING MOVING OBJECTS

FIELD OF THE INVENTION

The present invention relates to a device for detecting moving objects present in a vehicle's blind-spot, the device having at least one object detection sensor which, when the driver backs out of a parking space, detects the distance to objects moving at an angle to the vehicle and sends that information to an evaluation unit, and, based on the distance data sent to it, the evaluation unit determines the relative velocity, and as a function of the distance, the relative velocity, and the velocity of the driver's vehicle, a warning device is switched on which informs the driver of the object moving at an angle to his own vehicle.

BACKGROUND INFORMATION

An ultrasonic parking assistance device which assists the driver of a vehicle when parking in a parking space is known from the book *Autoelektrik, Autoelektronik* [Automotive Electrical Systems, Automotive Electronics], Vieweg Verlag, 1998, pp. 283-285 (chapter entitled "Parking Systems").

Furthermore, systems which monitor a vehicle's blind spot and inform the driver if an object is detected in the blind spot are known from the related art. Such a device is known heretofore for example from German Published Patent Application No. 42 28 794.

SUMMARY OF THE INVENTION

The object of the present invention is to further enhance a device in a motor vehicle suitable for detecting objects in a blind spot so that when the driver backs out of a parking space, the device detects vehicles moving at an angle and not only warns the driver but also assists him via other functions.

It is advantageous that as a function of the distance, the relative velocity, and the velocity of the driver's vehicle, the deceleration devices may be switched on by the evaluation device.

Furthermore it is advantageous that, using the evaluation device, the distance between the object moving at an angle and adjacent parked vehicles may be determined from the distance and relative velocity of the object moving at an angle to the driver's vehicle.

It is advantageous that the object detection sensor is a radar sensor, an ultrasonic sensor, a laser sensor, a video sensor, or a combination thereof.

It is advantageous that the radar sensor is designed as a pulse radar sensor.

Furthermore, it is advantageous that the at least one object detection sensor is integrated into the vehicle's bumper so that it is not visible from the outside.

It is advantageous that the object detection sensor is mounted on vehicle corners at an angle of approximately 45° to the vehicle's longitudinal axis.

Furthermore, it is advantageous that if the vehicle is being backed out of a parking space, the warning function is enabled when the driver engages the reverse gear.

Furthermore, it is advantageous that if the vehicle is backed out of a parking space, the warning function is enabled when the engine is switched on and the vehicle is still stationary.

Furthermore, it is advantageous that if the vehicle is backed out of a parking space, the warning function may be temporarily disabled via a driver-operated actuator until the function is used again.

According to a further embodiment of the present invention, a display unit is able to notify the driver whether the device is enabled.

It is advantageous that the evaluation device is able to issue a warning if the velocity of the driver's vehicle exceeds a predefined velocity threshold.

Furthermore, it is advantageous that the warning device provides the driver with a visual, acoustic, or visual and acoustic warning.

DETAILED DESCRIPTION

Figure 1:
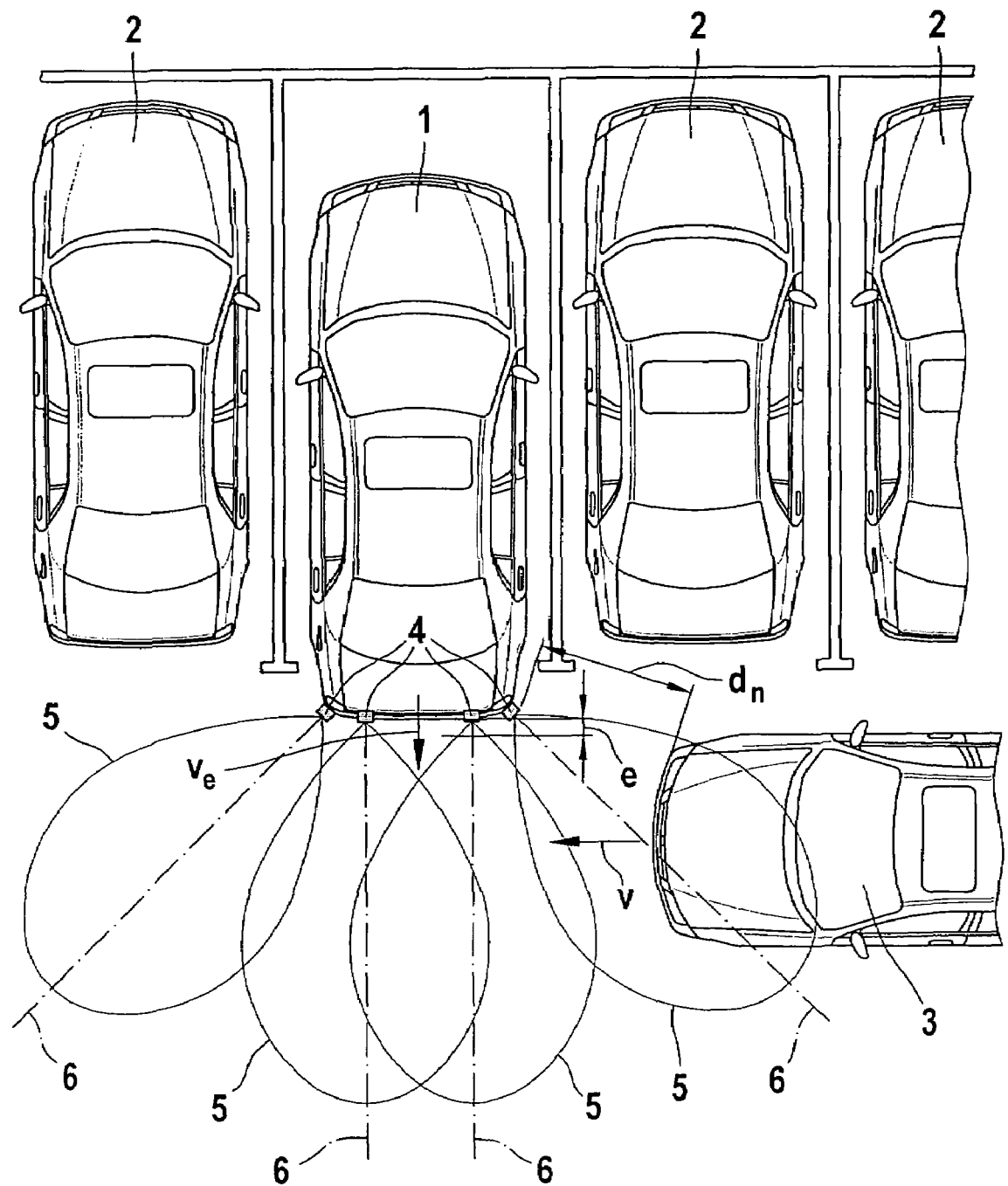
FIG. 1 shows an exemplary traffic situation in which the device according to the present invention may advantageously be used.

FIG. 1 shows a traffic situation in which the driver's vehicle 1 is backed out of a parking space, further vehicles 2 being parked next to the driver's vehicle 1. A vehicle 3 traveling at an angle past parked vehicles 2 and thereby endangering the driver's vehicle 1 is also shown. According to the present invention, the driver's vehicle 1 is equipped with at least one object detection sensor 4; in the example shown, vehicle 1 has a total of four object detection sensors. Object detection sensors are situated on the rear of vehicle 1 so that one sensor is provided on each rear vehicle corner and so that their main sensor axis 6 is at a 45° angle to the vehicle's longitudinal axis. Two additional object detection sensors 4 are situated on the rear, their main sensor axis 6 being parallel to the vehicle's longitudinal axis. This creates a detection area, as shown by the four sensor detection areas 5, in that sensor detection areas 5 partly overlap and thus cover the entire rear space behind vehicle 1, and also cover areas adjacent to and behind the rear space. The sensors are able to determine the distance to detected objects in sensor detection area 5 and their relative velocity. It is also feasible for sensors 4 to measure only the distance between objects and the driver's vehicle 1, the relative velocity of detected objects 3 being derived by generating the difference quotient based on the time from the distance. Furthermore, it is feasible to determine a distance e at which passing vehicle 3, which has been detected as an object, is passing the rear end of the driver's vehicle 1. Distance e is the perpendicular distance between the rear end of the driver's vehicle 1 and the extended line of travel of passing vehicle 3. Calculation of distance e is described in greater detail in FIG. 3. According to the present invention, the device is enabled when the vehicle's ignition is switched on or when the reverse gear is engaged while the ignition is switched on. If this switch-on condition is met, the device determines that the driver wishes to back up his vehicle 1, e.g. back it out of a parking space. If these switch-on conditions have been met, the sensors are enabled and use ultrasonic waves, radar waves, laser radiation, or an imaging system to measure the distance to objects which are present in sensor detection areas 5 or are entering those areas. If a vehicle 3, which is for example traveling at an angle past parked vehicles 2 and has not been noticed by the driver of vehicle 1, is detected according to the present invention, an evaluation unit to which these signals from object detection sensors 4 are sent issues an acoustic, visual, or acoustic and visual warning signal to alert the driver that a vehicle 3 traveling at an angle has been detected. Furthermore, it is feasible for the evaluation unit to switch on the deceleration devices of vehicle 1 and apply the brakes of vehicle 1 until it is stationary, in order to avoid a collision with vehicle 3 traveling at an angle.

Figure 2:
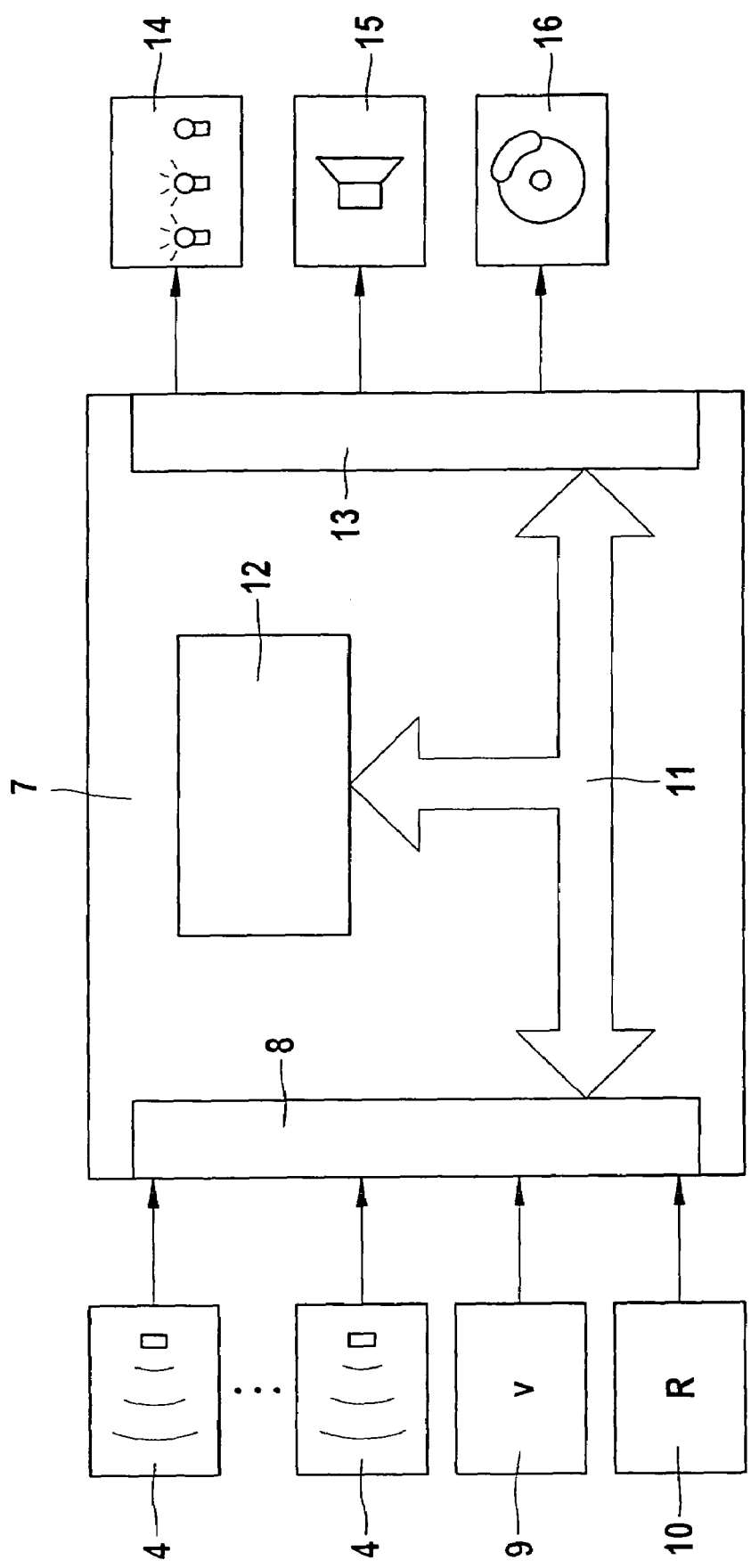
FIG. 2 shows a schematic block diagram of an exemplary embodiment of the device according to the present invention.

FIG. 2 shows a block diagram. Control device 7, which has among other things input circuit 8, is shown in the figure. Input signals are sent via input circuit 8 to control device 7. The signal of at least one of object detection sensors 4 is supplied as the input signal; in the example shown, vehicle 1 has four such object detection sensors, which send their signals to input circuit 8. Furthermore, a velocity signal from speed sensor 9, which measures the velocity of the driver's vehicle 1 and sends it to control device 7, is sent to input circuit 8. Moreover, further signals may be sent to input circuit 8, e.g., switch-on or switch-off signals or control signals from driver-operated actuators or a reversing signal from reversing switch 10, which determines whether the vehicle's reverse gear has been engaged. It is also feasible for a signal to be sent to input circuit 8 as soon as the vehicle's ignition has been switched on. Input circuit 8 sends the input signals via data exchange system 11 to calculation device 12, in which manipulated-variable signals are determined from the input signals and sent to subordinate actuating elements and controlled as a function of the input signals. The manipulated-variable signals determined by calculation device 12 are sent via data exchange system 11 to output circuit 13, which triggers for example a visual distance display unit 14, which indicates the distance of the detected object or the danger presented by the detected object. This may be accomplished for example via colored LEDs, an increasing number of LEDs being turned on as the level of danger increases. Furthermore, output circuit 13 may switch on an acoustic warning device 15, which uses a warning sound or spoken instructions to alert the driver about the imminent danger posed by detected objects. In the case of activation of acoustic warning device 15 or visual distance display unit 14, it is advantageous that not only distance $d_n$ from the detected object to the driver's vehicle 1, but also relative velocity $v_{rel}$ of the moving object and perpendicular distance e from perpendicularly passing vehicle 3 to the rear end of vehicle 1 are used to determine danger potential G, and the warning devices are switched on as a function of danger potential G. For example, if perpendicularly passing vehicle 3 is traveling at a high relative velocity, danger potential G increases, and a small distance e also results in an increase in danger potential G. Danger potential G also increases if distance $d_n$ between perpendicularly passing vehicle 3 and the driver's vehicle 1 decreases. Furthermore, it is feasible for the driver of vehicle 1 to temporarily disable control device 7 via a driver-operated actuator, e.g., this warning function is disabled for the imminent reversing-out procedure but is available again for the next backing-out procedure. Moreover, it is feasible for control device 7 to trigger the vehicle's deceleration devices 16, so that for example if the danger potential is high due to perpendicularly passing vehicle 3, vehicle 1 is automatically braked to a standstill.

Figure 3:
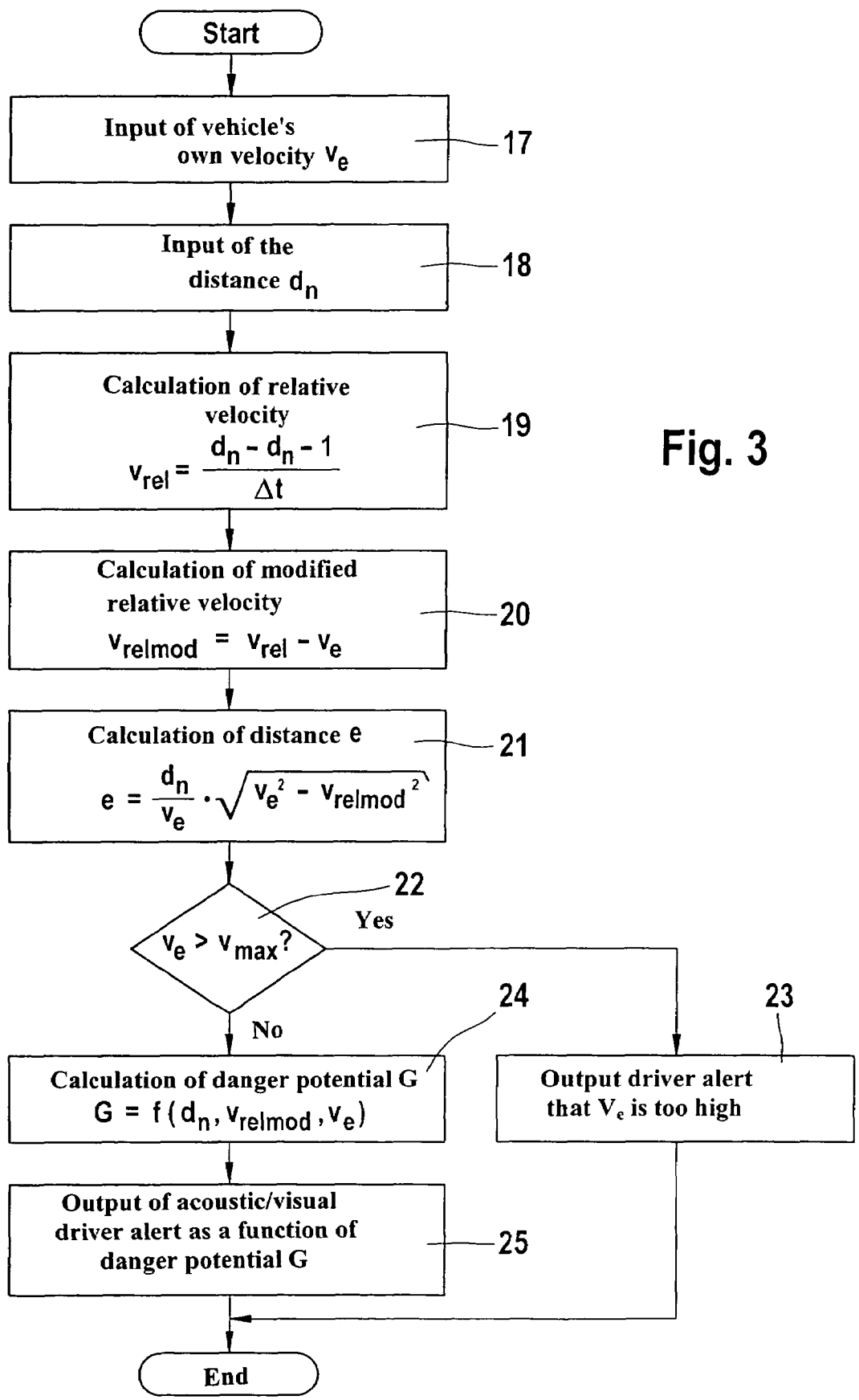
FIG. 3 shows a flow diagram as provided in the device according to the present invention.

FIG. 3 shows a flow diagram indicating the function according to the present invention. After the start of the function, which is triggered for example by engaging the reverse gear or switching on the vehicle ignition, the vehicle's own velocity $V_e$ is input in first step 17. In next step 18, distance $d_n$ to an object present in object detection area 5, e.g., a perpendicularly passing vehicle 3, is determined. This may be accomplished via pulse radar and a propagation time measurement. In next step 19, relative velocity $v_{rel}$ of perpendicularly passing vehicle 3 with regard to object detection sensor 4 of vehicle 1 is determined from calculated distance $d_n$ and from calculated distance $d_n-1$, which was determined in the preceding measuring cycle. To accomplish this, distance $d_n-1$ is subtracted from $d_n$ and divided by the time value $\Delta t$, time value $\Delta t$ being the time between two measuring pulses, i.e., two immediately consecutive measuring pulses. In next step 20, modified relative velocity $V_{relmod}$ is determined from the calculated relative velocity, velocity $V_e$ of the vehicle multiplied by a factor f being subtracted from calculated relative velocity $V_{rel}$. It is advantageous if factor f is no greater than 0.7, though it may also be less than that. Because velocity $V_e$ of vehicle 1 multiplied by factor f is subtracted, the calculation of modified relative velocity $V_{relmod}$ takes into account the velocity of the vehicle $V_e$, thereby reducing the likelihood of erroneous warnings associated with stationary objects in the perpendicular direction. In the next step 21, distance e is determined, which represents the perpendicular distance between the extended line of travel of perpendicularly passing vehicle 3 and the rear of the driver's vehicle 1. Assuming that the velocity of detected object 3 is constant between two measurement intervals, and that distance e is also constant over the time between two measurement intervals, and also assuming that velocity $V_e$ of the driver's vehicle is negligible with regard to total relative velocity $V_{rel}$, the azimuthal angle at which passing vehicle 3 is moving towards vehicle 1 may be determined approximately from the change in relative velocity $V_{rel}$ which arises as a result of the changing azimuthal angle. Distance 3 may also be determined in this way, and is calculated as follows subject to the aforementioned assumptions:

$$e = \frac{d_n}{v_e} + \sqrt{v_e^2 - v_{relmod}^2}$$

This distance e is used when danger level G is determined, distance $d_n$ between object 3 and vehicle 1, as well as modified relative velocity $V_{relmod}$, also being taken into account.

Because only low velocities of vehicle 1 are permitted for the procedure described, as the calculation method's capability threshold would otherwise be exceeded, a check is performed in step 22 to determine whether the velocity of the driver's vehicle $V_e$ is greater than a predefinable maximum velocity value $V_{max}$, which is definable as for example $V_e$=6 km/h. If velocity $V_e$ of vehicle 1 is greater than this predefinable velocity threshold $V_{max}$, the method branches in block 22 to "Yes" and in block 23 a warning is issued to notify the driver that the velocity $V_e$ of vehicle 1 is too great and the system's capability threshold has been exceeded. This driver warning may for example be acoustic or visual, or according to a further embodiment, the vehicle is automatically limited to a maximum velocity value $V_{max}$, e.g., via a trigger from deceleration devices so that $V_{max}$ is not exceeded or via automatic throttling of the engine output of vehicle 1. If it is determined in block 22 that velocity $V_e$ of vehicle 1 is less than or equal to maximum velocity threshold $V_{max}$, the method branches in block 22 to "No" and in block 24 danger level G is determined as a function of distance $d_n$, modified relative velocity $V_{relmod}$, velocity $V_e$, and distance e of perpendicularly passing object 3 from the objects 2 that delimit the road. To accomplish this, for example the anticipated future movements of the driver's vehicle 1 and of perpendicularly passing vehicle 3, and a time period until a calculated collision, or a path leading to a calculated collision, may be determined. As a function of the remaining time or remaining path, or if danger level G is exceeded beyond a boundary threshold $G_{max}$, an acoustic or visual driver warning is issued per block 25. Furthermore, it is also feasible to trigger the deceleration means of vehicle 1 in addition to an acoustic, visual, or acoustic and visual driver warning, so that a collision with perpendicularly passing vehicle 3 may be avoided. After block 23 or block 25, the method branches to END and starts again at START by way of an endless loop, provided the predefined enable conditions for the warning function are met. These conditions may be for example that the vehicle's reverse gear is engaged. If, when the backing-out maneuver has been completed, a gear is engaged that moves the vehicle forward, the process is ended and normal driving operation begins, the sensor being used for example for blind-spot detection only.

What is claimed is:

1. A device for detecting a moving object present in a blind-spot of a vehicle, comprising:
    at least one object detection sensor for detecting a distance to the moving object passing at an angle to the vehicle during an exit from a parking space and for sending a sensor output signal;
    a warning device; and
    an evaluation unit for receiving the sensor output signal, wherein:
        the evaluation unit determines a relative velocity from the distance of the moving object passing at the angle to the vehicle, and
        as a function of the distance, the relative velocity, and a velocity of the vehicle, the evaluation unit switches on the warning device to notify a driver regarding the moving object moving at the angle to the vehicle.

2. The device as recited in claim 1, wherein:
    the evaluation unit enables deceleration devices as a function of the distance, the relative velocity, and the velocity of the vehicle.

3. The device as recited in claim 1, wherein:
    the evaluation unit determines a distance between the moving object passing at the angle and an adjacent parked vehicles from the distance detected by the at least one object detection sensor and the relative velocity.

4. The device as recited in claim 1, wherein the at least one object detection sensor includes one of a radar sensor, an ultrasonic sensor, a laser sensor, a video sensor, and a combination thereof.

5. The device as recited in claim 4, wherein the radar sensor includes a pulse radar sensor.

6. The device as recited in claim 1, wherein the at least one object detection sensor is integrated into a bumper of the vehicle in such a way that the at least one object detection sensor is not visible from the outside.

7. The device as recited in claim 1, wherein the at least one object detection sensor is mounted on vehicle corners and is at about 45° to a longitudinal axis of the vehicle.

8. The device as recited in claim 1, wherein during maneuvers of leaving a parking gap, a warning function is enabled if the driver engages a reverse gear.

9. The device as recited in claim 1, wherein during maneuvers of leaving a parking gap, a warning function is enabled when an engine of the vehicle is switched on and the vehicle is at a standstill.

10. The device as recited in claim 1, wherein during maneuvers of leaving a parking gap, a warning function can be switched off temporarily via a driver-operated actuator until the warning function is used again.

11. The device as recited in claim 1, further comprising:
    a display device via which the driver is notified as to whether or not the device is enabled.

12. The device as recited in claim 1, wherein a warning can be issued if the velocity of the vehicle exceeds a pre-defined velocity threshold.

13. The device according to claim 1, wherein the evaluation unit issues at least one of a visual warning and an acoustic warning to the driver.

14. A method for detecting a moving object present in a blind-spot of a vehicle, comprising:
    detecting, by at least one object detection sensor, a distance to the moving object passing at an angle to the vehicle during an exit from a parking space;
    sending, by the at least one object detection sensor, a sensor output signal to the an evaluation unit;
    receiving, by the evaluation unit, the sensor output signal;
    determining, by the evaluation unit, a relative velocity from the distance of the moving object passing at the angle to the vehicle; and
    switching on, by the evaluation unit, a warning device to notify a driver regarding the moving object moving at the angle to the vehicle, the switching on being as a function of the distance, the relative velocity, and the velocity of the vehicle.

15. The method as recited in claim 14, further comprising:
    enabling, by the evaluation unit, deceleration devices as a function of the distance, the relative velocity, and the velocity of the vehicle.

16. The method as recited in claim 14, further comprising:
    determining, by the evaluation unit, a distance between the moving object passing at the angle and an adjacent parked vehicle from the distance detected by the at least one object detection sensor and the relative velocity.

17. The method as recited in claim 14, wherein the at least one object detection sensor includes one of a radar sensor, an ultrasonic sensor, a laser sensor, a video sensor, and a combination thereof.

18. The method as recited in claim 17, wherein the radar sensor includes a pulse radar sensor.

19. The method as recited in claim 14, wherein the at least one object detection sensor is integrated into a bumper of the vehicle in such a way that the at least one object detection sensor is not visible from the outside.

20. The method as recited in claim 14, wherein the at least one object detection sensor is mounted on vehicle corners and is at about 45° to a longitudinal axis of the vehicle.

21. The method as recited in claim 14, further comprising:
    enabling a warning function during maneuvers of parking space exits if the driver engages a reverse gear.

22. The method as recited in claim 14, further comprising:
    enabling a warning function during maneuvers of parking space exits when an engine of the vehicle is switched on and the vehicle is at a standstill.

23. The method as recited in claim 14, wherein during maneuvers of parking space exits, a warning function can be switched off temporarily via a driver-operated actuator until the warning function is used again.

24. The method as recited in claim 14, further comprising:
notifying the driver, via a display device, as to whether the warning device is enabled for notifying the driver regarding the moving object moving at the angle to the vehicle.

25. The method as recited in claim 14, wherein the notification is performed conditional upon that the velocity of the vehicle exceeds a pre-defined velocity threshold.

26. The method according to claim 14, wherein the notification is via as least one of a visual warning and an acoustic warning.

* * * * *